United States Patent [19]

Smith et al.

[11] Patent Number: 4,496,414

[45] Date of Patent: Jan. 29, 1985

[54] METHOD OF FORMING A BACKING MATERIAL

[75] Inventors: Merrill M. Smith, Morrisville, Pa.; Donald C. Ferguson, Trenton, N.J.

[73] Assignee: American Biltrite, Inc., Cambridge, Mass.

[21] Appl. No.: 407,918

[22] Filed: Aug. 13, 1982

Related U.S. Application Data

[62] Division of Ser. No. 234,402, Feb. 13, 1981, Pat. No. 4,379,185.

[51] Int. Cl.[3] .......... B29D 3/02; B32B 27/12

[52] U.S. Cl. .......... 156/246; 264/257; 264/271.1; 156/247; 156/289; 428/140; 428/255

[58] Field of Search .......... 428/139, 140, 255; 156/242, 243, 246, 247, 249, 289; 427/209, 261, 264, 265, 271, 282; 101/118, 129; 118/213, 406; 264/241, 257, 271.1, DIG. 60

[56] References Cited

U.S. PATENT DOCUMENTS

| | | | |
|---|---|---|---|
| 278,212 | 5/1883 | Birge | 427/264 |
| 2,359,825 | 10/1944 | Campbell | 101/115 |
| 2,842,473 | 7/1958 | Oberly et al. | 156/246 |
| 2,961,332 | 11/1960 | Navin | 117/11 |
| 3,072,497 | 1/1963 | Guglielmo | 428/255 |
| 3,222,237 | 12/1965 | McKelvy | 428/255 |
| 3,297,461 | 1/1967 | Siddal | 428/140 |
| 3,574,656 | 4/1971 | Sauntson | 117/6 |
| 3,589,289 | 6/1971 | Gosnell | 428/207 |
| 3,900,641 | 8/1975 | Woodman et al. | 428/38 |
| 3,973,489 | 8/1976 | Black | 101/115 |
| 4,017,658 | 4/1977 | Bomboire | 428/172 |
| 4,038,123 | 7/1977 | Sammis | 101/129 |
| 4,050,409 | 9/1977 | Duchenaud et al. | 101/115 |

*Primary Examiner*—Paul J. Thibodeau
*Attorney, Agent, or Firm*—Pennie & Edmonds

[57] ABSTRACT

A method is described for the continuous manufacture of inlaid vinyl sheeting using different colored plastisols and rotary screen printing equipment. The printing equipment comprises an unwind stand, an accumulator, a plurality of printing stations, a coating station, an oven, a second accumulator, and a wind up stand. Optionally an embossing station may also be used. Each printing station comprises (i) a rotary screen through which a different colored plastisol is squeezed to form a colored pattern on a base layer and (ii) a hot air dryer for partially drying the plastisol deposited on the base layer. In accordance with the invention, the viscosity of the plastisol and the rate of drying is such that plugs of plastisol are deposited on the base layer by each screen to form discrete portions of the total pattern created. Several different rotary screens are used to deposit these plugs of colored plastisols on the base layer so as to build up a pattern from the different colored plastisols. Advantageously, a wear coat is deposited on top of the layer of differently colored plastisols so that the final product consists of three layers: a backing, a decorative layer of differently colored plugs of plastisol, and a wear coat.

2 Claims, 9 Drawing Figures

METHOD OF FORMING A BACKING MATERIAL

This is a division, of application Ser. No. 234,402 filed Feb. 13, 1981 now U.S. Pat. No. 4,379,185.

BACKGROUND ART

This concerns a decorative sheet material of sufficient thickness and durability that it is suitable for use as a floor covering. More particularly, it concerns a multi-layered sheet material in which a colored design extends through the thickness of a major layer of the sheet material. Advantageously, the colored design is formed by a vinyl chloride plastisol. This also concerns a method for making such sheet material in a continuous process.

The vinyl sheet flooring manufactured today is primarily cushion sheet vinyl flooring and inlaid vinyl flooring. Of the two, inlaid vinyl sheet is the more desirable and commands the higher price because the decorative layer extends through the thickness of most of the sheet. To form an inlaid vinyl sheet, different colored vinyl chips are deposited on a stationary base layer in the desired decorative pattern. A clear urethane wear layer may be applied over this pattern which is then embossed in register with the desired decorative design. For example, to form an inlaid vinyl sheet having a pattern of multicolored bricks, predominately dark red chips might be deposited from a first stencil to form a first pattern representative of dark red bricks; somewhat lighter red chips might be deposited from a second stencil to form a second pattern in register with the first that is representative of lighter colored bricks; still lighter red chips might be deposited from a third stencil to form a third pattern in register with the other two; and predominately gray vinyl chips might be deposited to form a fourth pattern in register with the other three that is representative of the mortar between said bricks. Even more colors and stencils may be used as desired.

The resulting floor covering is highly desirable commercially since the color of the pattern extends throughout the thickness of the layer deposited atop the base layer. Typically, this layer is 35 mils or more thick and is considerably thicker than a urethane wear layer which ordinarily is about 2.50 mils thick. As a result, even if heavy usage should remove the wear layer, the flooring still retains its color until the entire thickness of the decorative layer is worn through. As will be apparent, however, the conventional manufacture of inlaid sheeting as described above is a complicated intermittent process that adds considerably to the expense of the vinyl product.

The apparatus for making conventional inlaid vinyl sheeting includes a conveyor belt on which the base layer is transported, a series of stencils which deposit the different colored vinyl chips on the base layer in the desired decorative pattern, a coater for applying a clear urethane wear layer, an oven for fusing the vinyl chips and wear layer and an embosser to emboss the pattern design. To make the inlaid sheets, the colored vinyl chips are manufactured by mixing vinyl resin, plasticizer, filler and pigment, forming sheets of the resulting mix, and then grinding up the sheets to form vinyl chips. The chips are then screened so that that are all within the desired size range. Next, the chips are placed in hoppers above the appropriate stencils. The base layer, which illustratively is an asbestos sheet, is then transported past the stencils. When the base layer is properly aligned with each stencil, it is stopped and the vinyl chips are raked across the stencil so that they fall through holes in the stencil to create a pattern on the base layer. The holes in the different stencils are aligned with one another so that the colored chips from the different stencils form a composite pattern on the base layer.

As will be apparent, the use of vinyl chips to make colored designs creates substantial color control and inventory problems at any high-speed, high-volume production facility. To ensure that each color is substantially uniform throughout a production run, it is necessary to prepare in advance of the production run all the vinyl chips that are used in that run. This requires the use of substantial storage capacity and all manner of equipment to transport the chips from storage bins to the stencils. Production is further complicated by the need to minimize downtime while refilling the supply of chips at the stencils.

Since the vinyl chips are resilient solids they tend to scatter in random directions at the time they are deposited on the base layer. This leads to a certain intermixing of the colors of the different patterns deposited on the base layer, a feature which may find attractive. In order to enhance this effect and provide some control over the amount of color intermixing that occurs, it is often desirable to intentionally intermix small amounts of vinyl chips of one or more colors with vinyl chips of another color. This, however, greatly increases the inventory of colors and the storage problems attendant thereto.

The scattering of vinyl chips also makes it impossible to define a pattern with precision. Adjacent patterns tend to blend into one another and it is difficult to determine where one begins or the other ends. While these effects are often attractive, they present limitations on the designs that can be used with inlaid vinyl flooring. In addition, this chip blending effect makes it difficult to obtain a distinct embossing in register with the pattern since the outline of the pattern is often vague. The scattering of the chips also affects the repeatability of a pattern because the same element in a pattern may not begin at the same spacing from adjacent elements in every replication of the pattern. Obviously, this can be a problem where it is necessary to match a pattern along the edges of two sheets.

DISCLOSURE OF INVENTION

To minimize these problems, we have devised a continuous method for the manufacture of inlaid vinyl sheeting that uses different colored plastisols and rotary screen printing equipment. The printing equipment comprises an unwind stand, an accumulator, a plurality of printing stations, a coating station, an oven, a second accumulator, and a wind up stand. Optionally an embossing station may also be used. Each printing station comprises (i) a rotary screen through which a different colored plastisol is squeezed to form a colored pattern on a base layer and (ii) a hot air dryer for partially drying the plastisol deposited on the base layer. In accordance with the invention, the viscosity of the plastisol and the rate of drying is such that the plastisol deposited on the base layer by each screen forms a discrete portion of the total pattern created. Several different rotary screens are used to deposit these colored plastisols on the base layer so as to build up a pattern from the different colored plastisols. Advantageously, a wear coat is deposited on top of the layer of differently colored plastisols so that the final product consists of three layers: a backing, a decorative layer of differently colored plastisols, and a wear coat.

In a preferred embodiment of our invention we make the inlaid vinyl sheeting in multiple passes through the printing equipment. In the first pass, we form the backing by using one of the rotary screen printing stations to deposit a continuous layer of plastisol about 6 to 8 mils (0.15 to 0.2 mm.) thick on a sheet of release paper. Next, an open mesh non-woven fiberglass webbing about 8 to 10 mils (0.2 to 0.25 mm.) thick is placed on top of the plastisol layer and finally a second layer of plastisol about 30 to 35 mils (0.76 to 0.89 mm.) thick is deposited on top of the fiberglass. These layers are then cured in an oven to form a substantially unitary, reinforced plastisol-fiberglass-plastisol composition. The release paper is then stripped from the cured composition and wound for reuse. The cured material is likewise wound up, pending its use as the backing material in the formation of the sheeting.

In the second pass through the equipment, the backing material is unwound and directed through the printing stations. Each printing station deposits on the backing material discrete plugs of plastisol of one color. Each plug is approximately cylindrical in shape with a diameter of about 15 to 60 mils (0.38 to 1.52 mm.), depending on the size of the hole in the rotary screen used to form it, and a height of about 8 to 20 mils (0.20 to 0.51 mm.). The patterns of the holes in the rotary screens of each of the printing stations are coordinated with each other so that the differently colored plugs deposited by the different printing stations combine to form the desired decorative pattern. For example, with our invention we form an inlaid vinyl sheet having a pattern of multicolored bricks by using one or more printing stations to deposit plugs of colored plastisol which represent the mortar between the bricks and then using one or more printing stations to deposit plugs of plastisol containing the colors of the bricks. By coating the entire backing layer with the plastisol representative of the mortar and then depositing the plastisol representing the bricks directly on top of the plastisol representing the mortar, an embossed effect can be achieved in which the embossing is exactly in register with the design of the brick. In addition, in depositing the second layer of plugs on top of the first, gaps in the two layers tend to be filled in and some randomness is imparted to the shapes of the individual plugs, thereby giving the overall design an appearance very similar to that of an inlaid vinyl sheeting material made in accordance with the prior art using colored vinyl chips.

After all printing operations are completed, a wear coat is deposited on top of the decorative layer of colored plastisols and the wear coat and colored plastisols are cured in an oven. If desired, the coated product may then be embossed in register with the pattern depicted by the colored plastisols. Obviously, if multiple passes are used for printing the colored plastisols, the wear coat is not added until all printing is complete. However, the plastisols that are printed during each pass should be cured in the oven during each pass so as to fix the patterns represented by the plastisols.

As will be evident, the foregoing process greatly reduces the inventory problems involved in making inlaid vinyl sheeting. Since the pigmentation is only a small percentage of the plastisol, numerous colors can be maintained on hand simply by storing relatively small volumes of pigments and mixing appropriately colored batches of plastisol as the need arises. Since the plastisols are liquid, uniformity of color throughout a given batch is relatively easy to achieve. The number of colors that can be used in forming the design is theoretically without limit. Additional colors can be deposited simply by passing the backing material through the printing equipment more than once.

In accordance with our invention the mesh of the rotary screens and the viscosity of the colored plastisols are such that discrete plugs of color are formed when the plastisols are deposited on appropriate backing material. These plugs adhere to the portion of the backing material on which they are deposited and have little or no tendency either to scatter as in the case of solid vinyl chips or to flow as in the case of conventional printing inks. As a result, pattern definition can be quite sharp and repeatability of pattern elements is excellent. Moreover, as will be detailed below, the invention permits numerous variations in processing to achieve different effects.

BRIEF DESCRIPTION OF THE DRAWING

These and other objects, advantages, features and elements of our invention will be more readily apparent from the following detailed description of the drawing in which.

BEST MODE FOR CARRYING OUT THE INVENTION

Figure 1A:
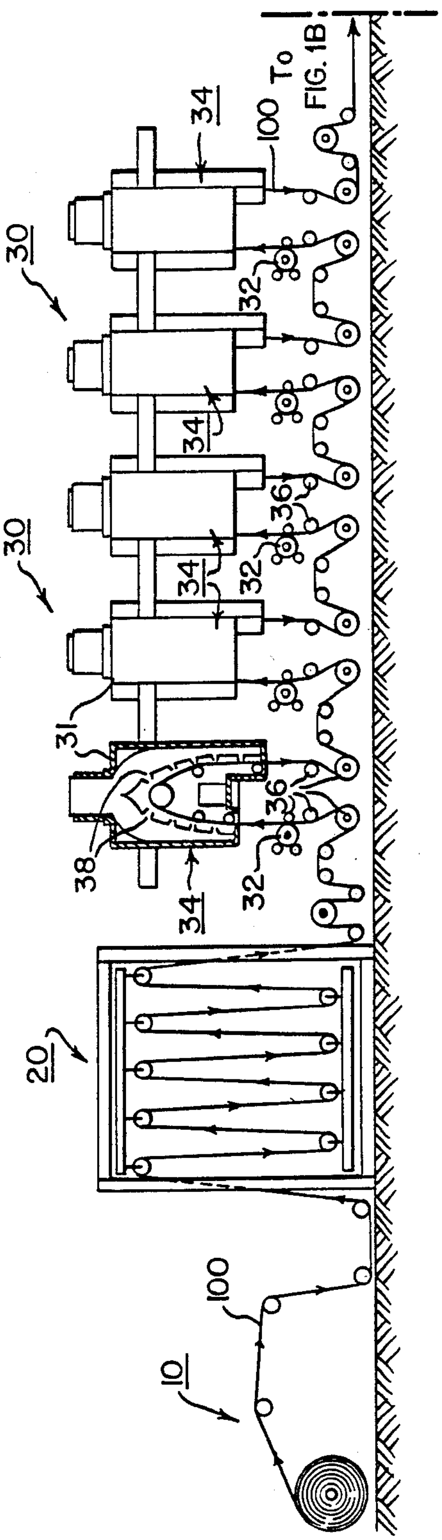
FIGS. 1A and 1B are schematic diagrams of illustrative apparatus used in the practice of the invention.
Figure 1B:
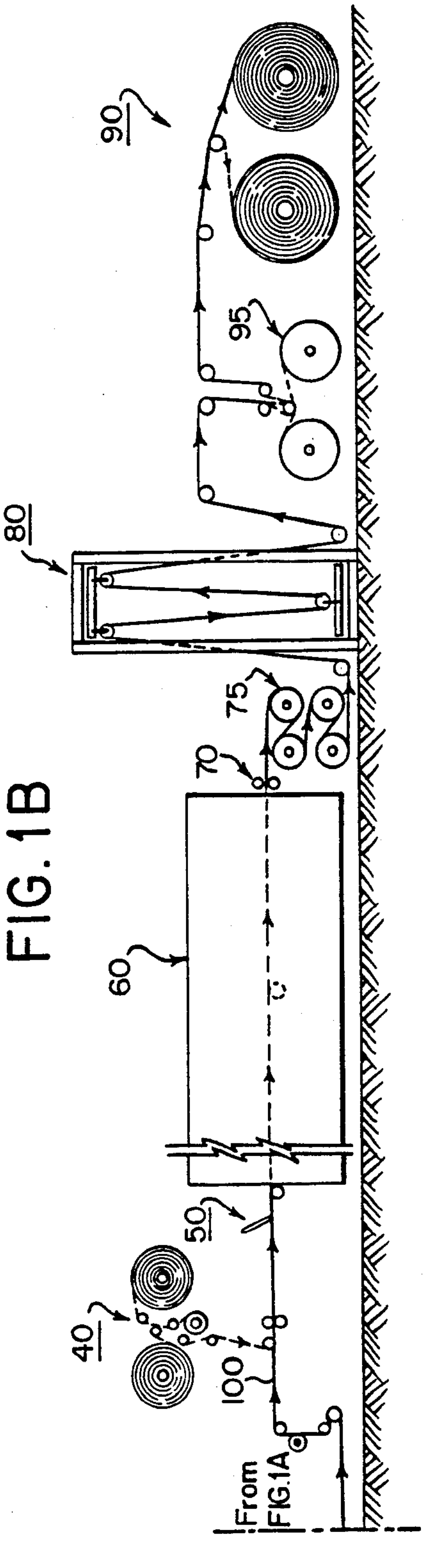

Illustrative apparatus for forming inlaid vinyl sheeting in accordance with the invention is depicted in FIGS. 1A and 1B. The apparatus comprises an unwind stand 10, an accumulator 20, a plurality of printing stations 30, a second unwind stand 40, a knife edge coater 50, an oven 60, an embossing station 70, cooling cans 75, a second accumulator 80, a stock windup stand 90, and a release paper windup stand 95. Each of the printing stations 30 comprises a rotary screen printer 32, a hot air dryer 34, and a series of conveyors 36. As is detailed below, the apparatus of FIGS. 1A and 1B is used to perform a series of operations on a web of material 100 that is transported through this equipment. Each rotary screen printer 32 is used to deposit plugs of differently colored plastisols on the moving web and this plastisol is partially gelled by hot air from jets 38 in hot air dryer 34. The individual components of the apparatus depicted in FIGS. 1A and 1B are old and will not be described in detail here. Their use, as detailed below, to make an inlaid vinyl sheeting having discrete plugs of differently colored plastisols is new.

In accordance with the invention the inlaid vinyl sheeting is made by a plurality of passes through the equipment depicted in FIGS. 1A and 1B. As shown in the cross section of FIG. 7, the inlaid vinyl sheeting is made of three layers: a backing 130, a decorative layer 135 and a wear coat 140. To make the backing, a web of release paper is guided from unwind station 10 through accumulator 20 and printing stations 30 to the rotary screen printer 32 of the last printing station where a first layer 145 of plastisol 6 to 8 mils (0.15 to 0.2 mm.) thick is deposited on the release paper. The type of screen and/or the viscosity of the plastisol are selected so that a continuous layer of plastisol is printed on the release paper. Next, an open-mesh non-woven fiberglass web 150 is deposited by unwind stand 40 on top of the first plastisol layer; and a second layer 155 of plastisol 30 to 35 mils (0.76 to 0.89 mm.) thick is deposited on top of the fiberglass web. Because the fiberglass web is open mesh, it contributes little to the final thickness of the backing material which illustratively is about 40 to 45 mils (1.02 to 1.14 mm.)

The web then enters an oven 60 where the plastisol layers are cured to form a substantially unitary, fiberglass reinforced plastisol-fiberglass-plastisol composition. After curing, the release paper is stripped away from the cured composition at windup stands 90 and 95; and the cured composition and the release paper are wound on separate rolls. The release paper may then be reused in the formation of other backings.

To print a decorative layer 135 on backing 130 in a second pass through the apparatus, the roll of backing is positioned in unwind stand 10. The web of backing is then fed through accumulator 20 and print stations 30; and at each printing station discrete plugs of plastisol of a different color are deposited thereon. Preferably, the web is printed on the side of the backing that was originally in contact with the release paper; and the roll of backing is wound and unwound accordingly.

Figure 2:
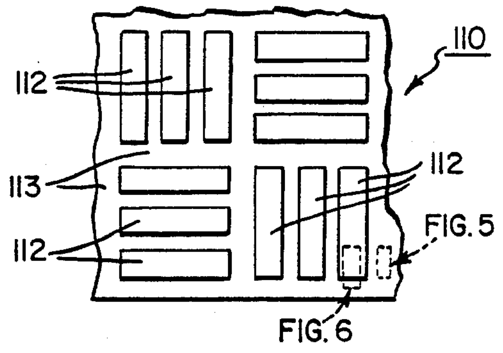
FIG. 2 is a top view of a portion of an inlaid vinyl sheeting formed in accordance with the invention.
Figure 3A:
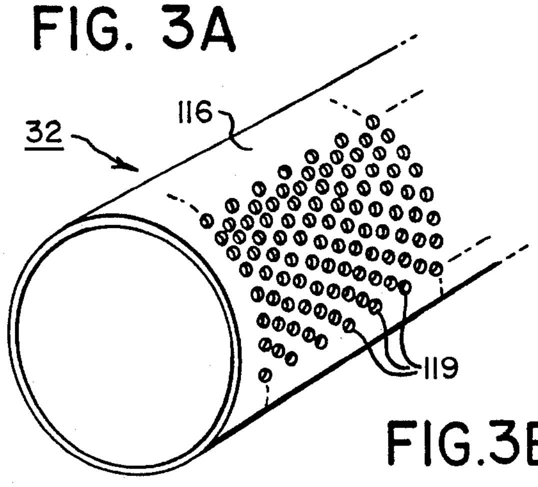
FIGS. 3A and 3B are schematic illustrations of portions of rotary silk screens used in the practice of the invention.
Figure 3B:
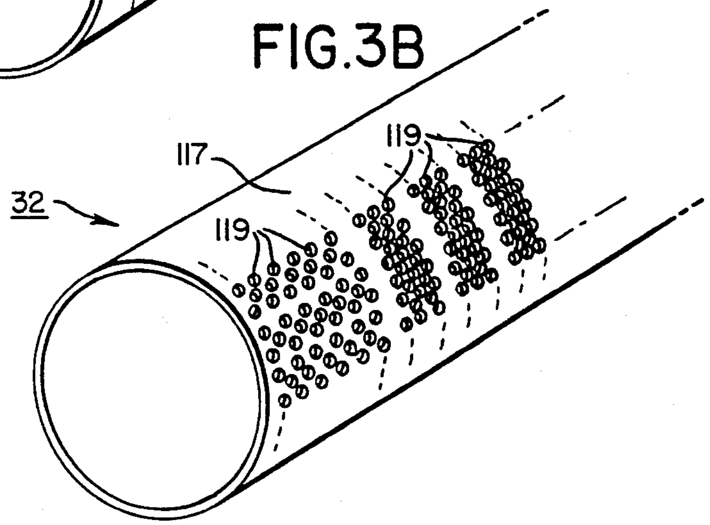

FIG. 2 depicts a top view of an illustrative example of an inlaid vinyl sheeting 110 made in accordance with our invention. As shown therein, the decorative pattern in said sheeting comprises a plurality of first regions 112 representing an array of bricks with each brick separated by a second region 113 representing the mortar between the bricks. To form sheeting having this pattern, it is preferable to print the mortar regions 113 in a first pass through the printing equipment and the brick regions 112 in a second pass. Illustrative examples of rotary screens 116 and 117 for printing portions of the mortar and brick patterns are depicted in FIGS. 3A and 3B. As is apparent, each screen contains an array of small holes 119 through which a plastisol may be squeezed. A different such screen is mounted in each rotary screen printer 32 in a printing station 30 and the angular position of the screens are set so that the pattern printed by each screen is in register with the patterns printed by the other screens.

Figure 4:
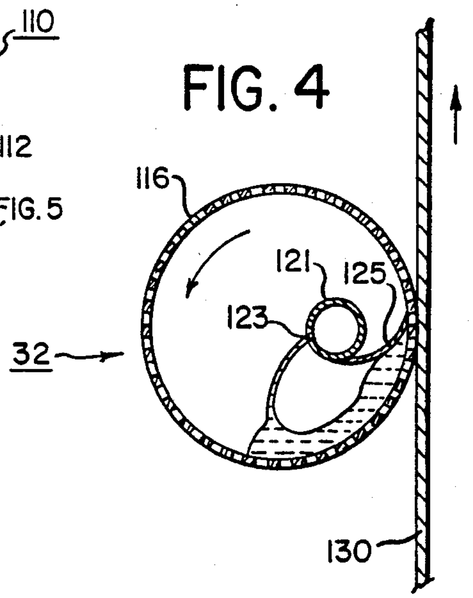
FIG.4 is a schematic illustration of a detail of FIG. 1A.

A side view of a rotary screen printer 32 is depicted in FIG. 4. In the center of screen 116 is a narrow tube 121 through which plastisol flows to the interior of the screen. A multiplicity of holes 123 in this tube permits the plastisol to flow out of the tube onto the inside surface of the screen. As the screen rotates in a counterclockwise direction, the plastisol is moved upwards against a squeegee 125 which is pressed tightly against the inside surface of the rotary screen. The squeegee forces the plastisol out through the holes in the screen onto the upper surface of the web of backing 130 that passes through each of the printing stations. Each plug of plastisol that is deposited on backing 130 is a three-dimensional solid with a shape approximately the shape of the hole through which it was squeezed and a height that is approximately the thickness of the screen. Illustratively, the screens used are stainless steel cylinders with cylindrical holes having a diameter on the order of 15 to 60 mils (0.38 to 1.52 mm.) and a thickness from 8 to 20 mils (0.20 to 0.51 mm.). Rotary silk screen printers are well known and do not of themselves form a part of this invention. Accordingly the details of construction and operation of the printer will not be discussed further.

Immediately after the plugs of plastisol are deposited on backing 130 at each printing station, the backing enters a hot air dryer 34 where the newly deposited plastisol is partially gelled. As a result, the plugs of colored plastisol deposited at each station are separately cured; and the different colors deposited at different stations remain distinct from one another. To a large extent, the individual plugs of the same color deposited at the same station also tend to remain distinct.

Figure 5:
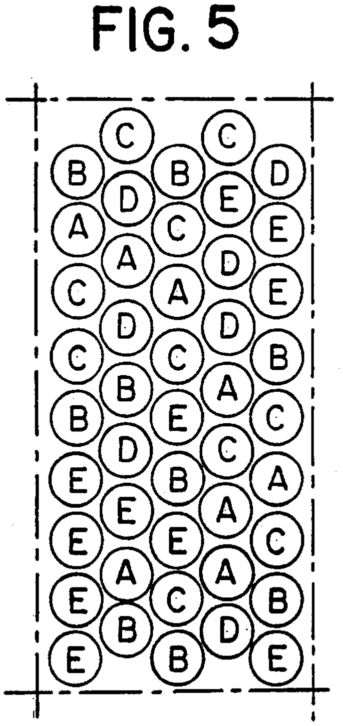
FIGS. 5 and 6 are schematic representations of enlarged details of FIG. 2.

To form the mortar pattern, the rotary screen at each of printing stations 30 defines approximately the same pattern depicted in FIG. 3A; but holes 119 in each of the five screens are in different relative positions. As a result each of the screens deposits discrete plugs of plastisol on different portions of backing 130. An enlarged illustrative segment of the mortar pattern that is deposited by the five printing stations is shown in FIG. 5. As schematically depicted therein, the first printing station deposits plugs A of plastisol having a first color, the second printing station deposits plugs B having a second color, the third station deposits plugs C having a third color, the fourth station deposits plugs D having a fourth color, and the fifth station deposits plugs E having a fifth color. The plugs are adjacent to one another but, as depicted in FIG. 5, for the most part maintain their separate identity.

Advantageously, the plugs of colored plastisol deposited by the five printing stations cover the entire surface of backing 130 so as to form a mortar layer 160 (FIG. 7) having a substantially uniform thickness on the order of 8 to 20 mils (0.20 to 0.51 mm.).

After the mortar pattern is printed on backing 120 and partially gelled at printing stations 30, it passes through oven 60 where it is further cured; and the web of backing 130 and mortar layer 160 is then wound on a roll in windup stand 90.

To form the brick pattern, the rotary screens at each of printing stations 30 are replaced by rotary screens which have approximately the same pattern depicted in FIG. 3B but with holes 119 in each of the screens in different relative positions. The previously wound roll of backing and mortar layer is then transferred to unwind stand 10; and the web is again fed through accumulator 20 and print stations 30. As a result, each of the screens deposits discrete plugs of plastisols on different portions of mortar layer 160 to form a brick layer 165 (FIG. 7) which likewise has a substantially uniform thickness on the order of 8 to 20 mils (0.20 to 0.51 mm.).

Figure 6:
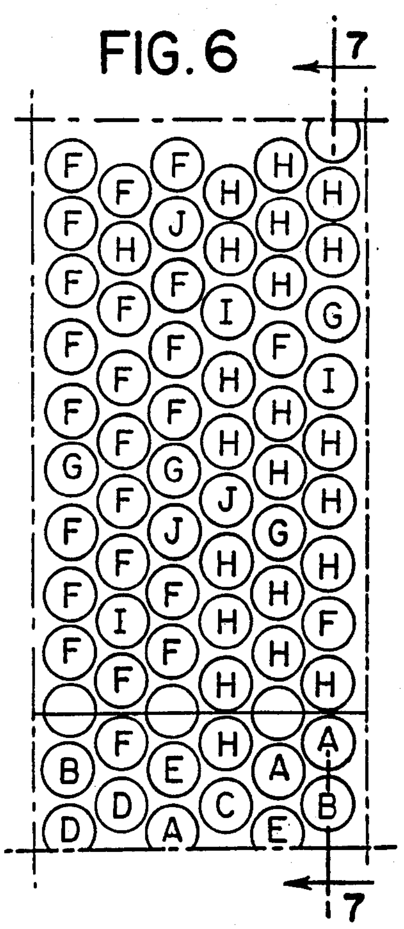
Figure 7:
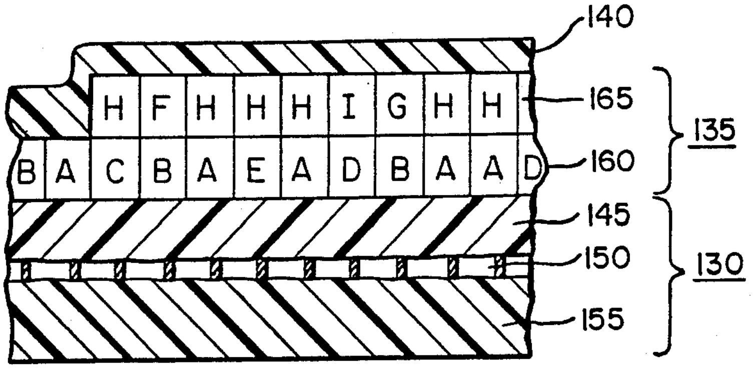
FIG. 7 is a schematic representation of a cross sectional view of FIG. 6 taken along line 7—7.

A top view of an enlarged illustrative segment of the brick pattern that is deposited by the five printing stations is shown in FIG. 6; and a cross-section through this view on line 7—7 is shown in FIG. 7. As schematically depicted therein, the first printing station deposits plugs F of plastisol having a first color, the second printing station deposits plug G of plastisol having a second color, the third station deposits plugs H of plastisol having a third color, the fourth station deposits plugs I of plastisol having a fourth color and the fifth printing station deposits plugs J having a fifth color. Again, the plugs are adjacent to one another but for the most part maintain their separate identity. Unlike the case of the mortar which was deposited over the entire surface of the underlying backing 130, the plastisol that defines the brick pattern is deposited on only portions of the underlying mortar layer 160 as shown in FIG. 7. As a result, an embossing effect is achieved by the printing operation such that portions of the decorative layer are only as thick as the mortar layer while other portions are as thick as the mortar and brick layers combined. As will be apparent, the thickness of the design will be in register with the design with the minimum thickness being about 8 mils where there is only one layer atop the backing and about 16 mils where one layer of plugs of plastisol is deposited on top of another layer.

After brick layer 165 has been printed and partially gelled at printing stations 30, a clear plastisol wear coat 140 is applied by a conventional knife coater 50 to the upper surface of decorative layer 135. Illustratively, the thickness of this coat is on the order of 10 mils (0.25 mm.) over brick layer 165 and is thicker over those portions of the pattern where there are no bricks. Next, the wear coat and decorative layer are cured in oven 60. After curing they may be embossed, if desired, at embossing station 70. Advantageously, any embossing should be in register with the design in the decorative layer. Illustrative apparatus for embossing in register with a design is described in U.S. Pat. No. 3,465,384 to Barchi, et al. and U.S. patent application Ser. No. 120,536 assigned to American Biltrite, Inc., both of which are incorporated herein by reference. Embossing registration equipment is available from Bobst Champlain. The final product may then be rolled at windup stand 90 and prepared for shipping.

As will be apparent, numerous variations can be made in the foregoing processing steps to achieve different visual effects. Different size holes can be used in the silk screen in order to print plugs of different diameters. The holes on one screen can be different from those on another and different sized holes could even be used on the same screen. The thickness of the screens and the angle or pressure of the squeegee can be varied so as to vary the thickness of the layers of plastisol that are deposited on the screens.

In accordance with the invention, at least one layer of plugs of colored plastisols should be printed on top of another layer to achieve three dimensional effects and to create the appearance of an inlaid vinyl sheeting made in accordance with the prior art using colored vinyl chips. It will, however, be apparent that this uses large amounts of pigmented plastisols which are relatively expensive. Accordingly, a less expensive inlaid vinyl sheeting may be prepared simply by printing each portion of the decorative pattern only on the backing. For example, with reference to the brick pattern illustrated in FIG. 2, the mortar pattern might be printed only on those portions of the backing that correspond to the spaces between the bricks in the final design. In such case the mortar pattern would be a open lattice. The bricks would then be printed directly on the backing inbetween the plastisol lattices defining the mortar. As a result, there is only one layer of plugs of pigmented plastisol and the thickness of this layer is on the order of 8 to 20 mils (0.20 to 0.51 mm.) depending on the thickness of the rotary screens. While such a sheeting material is less expensive to make, it lacks the vibrant color and appearance of inlaid vinyl sheeting that can be attained by printing at least one layer of plugs of colored plastisol on top of another layer.

Alternatively, at the cost of additional materials and processing steps, even more layers of plastisols could be printed than the two layers depicted in the illustrative example of FIG. 7.

As is well known, a plastisol is a thermoplastic resin in which fine particles are uniformly dispersed in plasticizer. When a plastisol is heated sufficiently to cure, it becomes a tough thermoplastic material. In the formation of sheeting materials, plastisols of vinyl choloride homopolymers and/or copolymers are conventionally used.

The backing layer used in practicing the invention can be made with any conventional plastisol that can be deposited by a rotary screen to form a continuous layer. Such plastisols are widely used with rotary screens in the manufacture of sheeting materials. The pigmented plastisols, however, must be formulated with care so that they will form discrete plugs of plastisol in the sheeting material.

EXAMPLE

An illustrative example of a pigmented plastisol which may be used in the practice of the invention is formed by adding pigment to the following formulation of an unpigmented base plastisol:

| Ingredient | Description | Manufacturer | Weight % |
|---|---|---|---|
| S-160 | Butyl Benzyl Phthalate Plasticizer | Monsanto | 6.29 |
| S-711 | Mixed C7–C11 Phthalate Plasticizer | Monsanto | 5.16 |
| G-62 | Epoxidized Soybean Oil | Rohm & Haas | 2.10 |
| V-1700 | Ba—Zn—Phosphite heat stabilizer | Tenneco | 1.06 |
| Trem 014 | Viscosity Modifier | Diamond Shamrock | 0.26 |
| BR-520 | PVC Extender Resin | Tenneco | 11.78 |
| Varnolene | Mineral Spirit | Amsco-Union | 5.94 |
| FPC-605 | PVC Dispersion Resin | Firestone | 21.68 |
| FPC-6366 | PVC Dispersion Resin | Firestone | 5.66 |
| NX-1005 | Dolomite Filler | Pfizer | 38.89 |
| $TiO_2$ | Pigment | N.J. Zinc | 1.18 |
| | | | 100.00 |

The Brookfield viscosity of the plastisol is adjusted to be about 25 to 35 poise, measured with a No. 4 spindle at 25° C. at 20 rpm. To color this base, appropriate quantities of pigments such as black oxide 90-Q-1031, yellow oxide 20-Q-943, red oxide 40-Q-2113 and titanium dioxide 10-Q-672 available from Del Val Ink & Color Inc. may be added.

An illustrative example of the clear coat formulation is as follows:

| Ingredient | Description | Manufacturer | Weight % |
|---|---|---|---|
| Nuoplaz 1046 | Benzoate plasticizer | Tenneco | 21.56 |
| TXIB | Isobutyrate plasticizer | Eastman Chemical | 6.16 |
| X-980 | Cross-linking Acrylate Monomer | Rohm & Haas | 3.08 |
| Experox 10 | T-dibutyl Perbenzoate (catalyst) | Witco | 0.03 |
| G-62 | Epoxidized | Rohm & Haas | 3.08 |

-continued

| Ingredient | Description | Manufacturer | Weight % |
|---|---|---|---|
| | Soybean Oil | | |
| V-1700 | Ba—Zn—Phosphite heat stabilizer | Tenneco | 1.54 |
| PE-40 | Ethoxylate Nonyl Phenol (Viscosity Modifier) | Diamond Shamrock | 0.62 |
| Varnolene | Mineral Spirit | Amsco Union | 2.16 |
| Mark 1413 | U.V. Absorber | Argus Chemical | 0.18 |
| Geon 120X271 | Dispersion Resin | Goodrich | 55.43 |
| BR501 | Extender Resin | Tenneco | 6.16 |
| | | | 100.00 |

Illustrative operating temperatures for the hot air dryers 34 of printing stations 30 are 270° to 290° F. (132° to 143° C.). At these operating temperatures the temperature of the plastisol rises to about 200° F. (121° C.) in the dryer. Illustrative operating temperatures for oven 60 are in the range of 320° to 380° F. (160° to 193° C.). In the course of oven curing, the temperature of the plastisol and wear coat rises to approximately 350° F. (177° C.).

As will be apparent, numerous variations may also be made in the equipment used in the practice of the above described invention. Of particular interest, it should be noted that the practice of the invention is not limited to the use of rotary screen printers which print on vertical surfaces as shown in FIG. 4. Any orientation of the printing station is acceptable. For example, horizontal printing stations are also available commercially and can be used in practicing the invention. While the rotary screens typically will have cylidrical holes of the sizes described above, holes of other shapes and sizes may be used in the practice of the invention to form plugs of plastisol having corresponding shapes and sizes. Likewise, numerous variations may be made in the process of forming the decorative sheeting of the invention. While at least two layers of plugs of colored plastisol are needed on portions of the backing material to achieve three-dimensional embossing effects and the appearance of conventional inlaid vinyl flooring, the invention may be practiced with a multiplicity of such layers. Inasmuch as the minimum thickness of a layer of plugs of plastisol is about 8 mils, this is also the minimum thickness of decorative layer 135. The maximum thickness is a matter of choice depending on the design that is built up by the layers of plastisol plugs.

What is claimed is:

1. A method of forming a backing material comprising the steps of:

depositing a first layer of plastisol on a release paper, said first layer of plastisol having a thickness of at least approximately 6 mils (0.15 mm.);

depositing an open mesh webbing on said first layer;

depositing a second layer of plastisol on said webbing and first layer;

curing the two layers of plastisol to form a substantially unitary layer encompassing said webbing; and stripping the release paper from the substantially unitary layer formed by curing.

2. The method of claim 1 wherein said open mesh webbing comprises fiberglass.

* * * * *